G. P. Dodge,
Rubber Belting.
N° 61,173.  Patented Jan. 15, 1867.
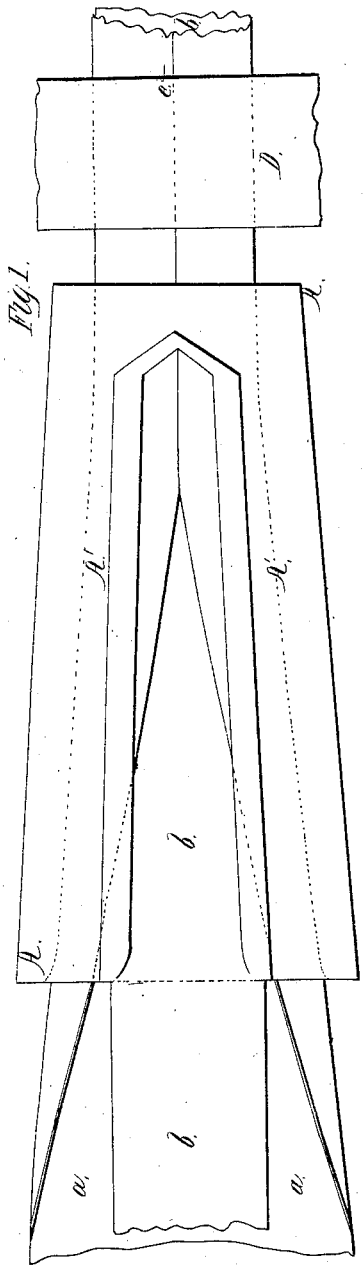
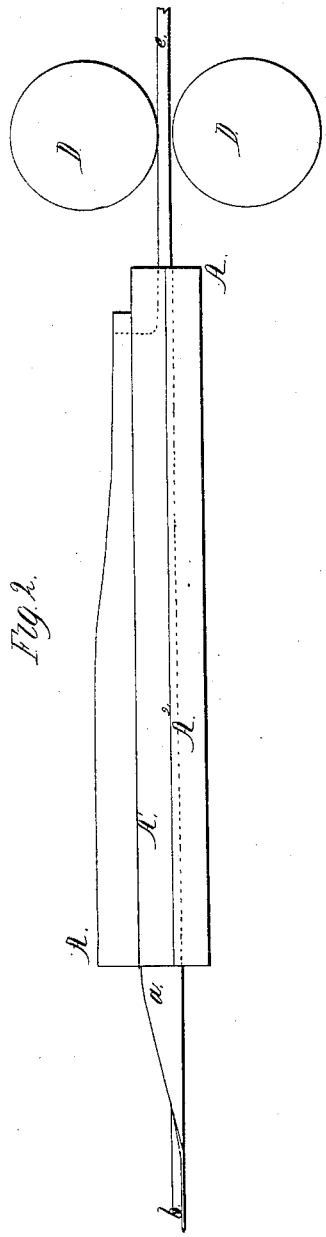
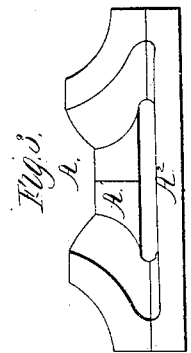
Witnesses:
A. R. Thompson
F. W. Carter
Inventor:
George Pomeroy Dodge

United States Patent Office.

GEORGE POMEROY DODGE, OF LONDON, ENGLAND, ASSIGNOR TO NATHANIEL SHATTSWELL DODGE, OF WASHINGTON, D. C.

Letters Patent No. 61,173, dated January 15, 1867.

IMPROVEMENT IN THE MANUFACTURE OF RUBBER BELTING.

*The Schedule referred to in these Letters Patent and making part of the same.*

---

Be it known that I, GEORGE POMEROY DODGE, of London, England, have invented certain new and useful "Improvements in the Manufacture of Bands or Belts of India Rubber and other Materials;" and I do hereby declare that the following is a full, clear, and exact description of the construction and operation of the same, reference being had to the annexed drawings, making a part of this specification, in which—

Figure 1 is a plan of the apparatus employed in the manufacture of said belts or bands.
Figure 2, a side elevation.
Figure 3, a rear view; and
Figure 4, a front view of the same.
Like letters refer to corresponding parts in each of the figures.

The moulder A is by preference made in two halves, $A^1 A^2$, which can be joined firmly together by any convenient means, and made to take a thicker or thinner band by means of packings between the halves, and on working must be fastened firmly in place if the band is to be dragged through it. The method of passing the coated duck or other material through the moulder, is shown in figs. 1 and 2, $a$ being the under strip requiring to be folded over the narrow strip $b$, so as to about meet and make a seam in the centre of the band or portion thereof. The narrow strip $b$ is placed upon the wider strip, at a convenient distance from the moulder A. Rolls D may be provided for securing pressure on the band after it has been formed into shape by the moulder. $e$ shows the newly formed band or portion thereof after emerging from the moulder and rolls. For guiding the strips into the moulder, or for guiding the inside or narrower strips into the outside or wider strips, various arrangements of guiders, pegs, rollers, and other devices may be employed, but as such can be greatly varied with the same or equivalent effect, and as they are only useful in connection with the moulder, I lay no claim to any particular arrangement thereof. The method of making machine bands by means of the moulder A, and the accompanying apparatus, does not essentially differ from making them by hand up to the time they are about to be passed through the moulder. The cotton duck or other fabric being already coated with India rubber or other gum or compounds of either, and cut into strips of suitable width by hand or by apparatus adapted to the purpose, one strip cut to such a width as to double over other strips (if the band be required to consist of more than two layers or plies, which this strip doubled would itself form,) is either wound on a roll laid on a table or otherwise placed in a convenient position for passing through the moulder A. Another strip or other strips, according to the numbers of layers or plies of which the proposed band is to be formed, is then cut, folded, or otherwise formed to about half the width of the first-named strip, and placed in such a position that it shall be laid upon the under strip, leaving about an equal margin on each side, before the latter enters the moulder, so that when the under strip is folded over the narrower, a seam shall be formed about equidistant from each edge of the band (or portion thereof) formed by the process of folding the under strip over the narrower. Immediately after the newly formed band or portion thereof leaves the moulder, (or even while in the moulder,) pressure should be applied to render the band homogeneous and stick it well together, and this I find may conveniently be applied by means of rolls.

Having thus fully described the nature of the said improvements, and shown how the same may be conveniently and advantageously carried into practice, I wish it distinctly understood that I do not confine myself to the details herein set forth, but these bands or belts having heretofore been formed by hand, I claim, and desire to secure by Letters Patent of the United States—

The mode of manufacturing bands or belts composed of fabric and gums or sticky substances, substantially as herein described.

GEORGE POMEROY DODGE.

Witnesses:
A. R. THOMPSON, 22 *Westbourne Terrace Road, London.*
F. W. CARTER, 171 *Kentish Town Road, London.*